(12) United States Patent
Haeffelin et al.

(10) Patent No.: US 10,730,248 B2
(45) Date of Patent: Aug. 4, 2020

(54) METHOD FOR PRODUCING A COMPONENT FROM A FIBER-COMPOSITE MATERIAL

(71) Applicant: BOGE ELASTMETALL GMBH, Damme (DE)

(72) Inventors: Daniel Haeffelin, Osnabrueck (DE); Olaf Beutler, Diepholz (DE); Burkhard Tiemann, Bad Essen (DE); Felix Kamotzke, Osnabrueck (DE)

(73) Assignee: BOGE ELASTMETALL GMBH, Damme (DE)

( * ) Notice: Subject to any disclaimer, the term of this patent is extended or adjusted under 35 U.S.C. 154(b) by 85 days.

(21) Appl. No.: 16/097,055

(22) PCT Filed: May 23, 2017

(86) PCT No.: PCT/EP2017/062488
§ 371 (c)(1),
(2) Date: Oct. 26, 2018

(87) PCT Pub. No.: WO2017/202883
PCT Pub. Date: Nov. 30, 2017

(65) Prior Publication Data
US 2020/0094489 A1 Mar. 26, 2020

(30) Foreign Application Priority Data
May 25, 2016 (DE) .......... 10 2016 109 728

(51) Int. Cl.
*B29C 51/02* (2006.01)
*B29C 70/34* (2006.01)
*B29C 70/16* (2006.01)

(52) U.S. Cl.
CPC ............ *B29C 70/34* (2013.01); *B29C 51/02* (2013.01); *B29C 70/16* (2013.01)

(58) Field of Classification Search
CPC ..... B29C 70/34; B29C 70/345; B29C 70/083; B29C 51/02
(Continued)

(56) References Cited

U.S. PATENT DOCUMENTS

| | | |
|---|---|---|
| 3,926,708 A | 12/1975 | Long |
| 4,878,972 A | 11/1989 | Kaneko et al. |
| 5,294,394 A | 3/1994 | Sakai et al. |

FOREIGN PATENT DOCUMENTS

| | | |
|---|---|---|
| CN | 1031345 A | 3/1989 |
| DE | 102 53 300 A1 | 6/2004 |

(Continued)

*Primary Examiner* — Scott W Dodds
(74) *Attorney, Agent, or Firm* — Cohen & Hildebrand, PLLC (57) ABSTRACT

A method for producing a component from a fiber-composite material, wherein a plurality of fiber-tape pieces, which each comprise a thermoplastic fiber-tape piece matrix with fiber-tape-piece fibers embedded therein, are provided, the fiber-tape pieces are picked up in the solid state and arranged so as to form a fiber-tape pattern, a backing layer, which comprises a thermoplastic backing-layer matrix with backing-layer fibers embedded therein, is provided and heated such that the backing-layer matrix softens or melts, a preform is formed from the backing layer and the fiber-tape pattern in that the fiber-tape pattern is applied in the solid state to the heated backing layer and is heated thereby so that the fiber-tape-piece matrices soften or melt such that the preform is in a deformable state in which both the backing-layer matrix and the fiber-tape-piece matrices have been softened or melted, the preform in the deformable state is deformed.

14 Claims, 4 Drawing Sheets (58) Field of Classification Search
USPC .................................................. 156/309.6
See application file for complete search history.

(56) References Cited

FOREIGN PATENT DOCUMENTS

| | | |
|---|---|---|
| DE | 10 2006 025280 A1 | 12/2006 |
| DE | 10 2012 111 488 | 5/2014 |
| EP | 0491353 A1 | 6/1992 |
| EP | 0421767 A2 | 4/1994 |
| WO | 2008 110 614 | 9/2008 |

METHOD FOR PRODUCING A COMPONENT FROM A FIBER-COMPOSITE MATERIAL

This is an application filed under 35 USC § 371 of PCT/EP2017/062488, filed on May 23, 2017 claiming priority to DE 10 2016 109 728.4, filed on May 25, 2016, each of which is herein incorporated by reference in its entirety.

BACKGROUND OF THE INVENTION

The invention relates to a method for producing a component from a fiber composite material.

DE 102 53 300 A1 discloses a process for producing structural components with a plastic matrix material that is reinforced by glass fibers, wherein intentionally aligned carbon fibers are at least partially provided according to load paths of the component in the loaded state. In particular, the aligned carbon fibers are embedded between two layers of substantially randomly oriented fiberglass structures.

EP 0 491 353 A1 discloses a method, wherein load-path-oriented fiber portions are applied by pressing locally with a pressure roller while also locally heating the fiber tape. This method has the disadvantage that several fiber orientations cannot be applied at the same time. In addition, this method limits the geometric complexity of components.

DE 10 2006 025 280 A1 discloses a method for producing a fiber-reinforced component, wherein a bundle of a continuous fiber is impregnated and this fiber/matrix strand is placed with almost the final contour in a temperature-controlled device over a nozzle by a handling device and thereafter consolidated. In particular, the fiber/matrix strand with the continuous fiber is placed in the mold and in other areas a fiber/matrix strand with long or short fibers.

Fiber composite materials are produced by labor-intensive and cost-intensive processes, wherein the fiber composite material consists of a proportion of fibers and a proportion of a matrix. When processing continuous fiber-reinforced thermoplastics, it is therefore customary to reshape flat intermediate products which already contain a sufficient proportion of thermoplastic matrix in the fiber material. This blank is referred to in particular as a board, wherein the starting material of the board is preferably an organic sheet. For example, an organic sheet is done produced, inter alia, by layering flat semi-finished fiber products which are pressed together with thermoplastic materials in film and/or powder form by applying pressure and temperature In particular, all forms of thermoplastic materials can be used as a matrix material of the organic sheet. Typical representatives are polyamides, polypropylenes, polyethylene terephthalates, polyether ether ketones, polyphthalamides and thermoplastic polyurethanes.

In particular, an intermediate product, which preferably comprises the fiber material and a thermoplastic matrix material, is referred to as a preform, which passes through the processing conditions or processing states of a semi-finished fiber product from merging all continuous fiber fractions and their matrix components. A preform preferably passes through the processing conditions or processing states at the continuous fiber portion until it is fully formed.

It is customary for an economical production of the starting material of the boards to produce, in a first step, a large-area fiber material in form of a sheet product, from which the board is then cut out. As part of the manufacturing step of this sheet product, a tensile stress on the fiber material is necessary for process control which requires a continuous fiber across the width of the sheet product. The board is thereby limited to a fiber architecture that is constant over the entire surface.

Fibers have enhanced mechanical properties in their longitudinal direction. Therefore, in the mechanical design of the fiber material in the component, the alignment of the continuous fiber material is oriented on and along the load paths of the product. Components can have areas of higher load, with respect to which the wall thickness, the fiber structure and the fiber path are designed. This causes oversized wall thicknesses in the continuous fiber material in surrounding areas of the stress peak, which cannot be avoided due to the way the circuit board is manufactured. However, the cost structure of products of this material class requires economical use of the base material (organic sheet). This leads to a conflict between objectives of economy and mechanical properties of the continuous fiber material.

Methods are known which provide for a direct layering of the endless fiber material on planar or three-dimensional backing-layers, which are subsequently shaped such that the fiber material is disposed in the load path. These methods can be distinguished as methods for processing unconsolidated (dry) fibers and methods for processing consolidated fibers (fibers provided with a matrix). Processes of dry-layering (e.g. TFP: Tailored Fiber Placement) stitch reinforcing fibers with a sewing thread onto a carrier material which are, in the course of further processing, impregnated with a chemically/thermally curing resin and fixed to form a component. The process parameters used for impregnation, such as pressure and temperature, however, lead to an increase in equipment costs.

Processes for load-path-oriented processing of thermoplastically consolidated semi-finished products are based either on an intimate material connection of the reinforcing fibers to a carrier or on a preliminary fixation of the fiber with subsequent consolidation in a subsequent method step. Among other things, thin tapes can be deposited along paths of the component geometry to be traveled. In this type of process, the geometric complexity is limited by the radii of the continuous fibers that can be deposited and the dimension of the depositing facilities.

If, however, fiber tapes made of continuous fiber reinforcement are laid down along paths on three-dimensional geometries over the length of a component, differences in length between the inside of the curve and the outside of the curve limit the radii that can be deposited error-free and consequently also limit the geometric component complexity.

The application of reinforcing fibers to increase the anisotropy of continuous fiber products is thus known. The known methods have the particular disadvantage that either an intermediate product is created before heating, which results in at least one additional method step and a deterioration of the material properties, or that the reinforcing fiber components are sequentially deposited onto the substrate as a pattern, which also requires an additional method step and reduces the speed of the production line. Furthermore, the use of hot melt adhesives is known, which however leads to a material-inhomogeneous fiber matrix.

On this basis, it is therefore the object of the invention to provide a simpler method for producing a component from a fiber composite material.

BRIEF SUMMARY OF THE INVENTION

This object is attained by a method according to claim 1. Preferred embodiments of the invention are recited in the dependent claims and in the following description.

According to the invention, a method for producing a component from a fiber composite material is provided, wherein a) several fiber tape segments, which each comprises a thermoplastic fiber tape segment matrix with embedded fiber tape segment fibers, are provided, b) the fiber tape segments are taken up in the solid and/or rigid state, for example at room temperature, and arranged to form a fiber tape pattern, c) a backing-layer comprising a thermoplastic backing-layer matrix with backing-layer fibers embedded therein is provided and heating such that the backing-layer matrix softens and/or melts, d) a preform is formed from the backing-layer and the fiber tape pattern, by applying the fiber tape pattern to the heated support layer in the solid and/or rigid state, in particular directly, whereby the fiber tape pattern is heated, in particular by contact heat, so that the fiber tape segment matrices soften and/or melt such that the preform is in a formable state in which both the backing-layer matrix and the fiber tape segment matrix are softened and/or melted, and e) the preform present in the formable state is formed, in particular to form the component or a component.

In the method according to the invention, the fiber tape pieces are arranged in the solid and/or rigid state to form the fiber tape pattern, which is applied in the solid and/or rigid state, in particular in its entirety, to form the preform on the heated backing-layer. The fiber tape pieces therefore remain solid and/or rigid until they come into contact with the backing-layer and are thus easier to handle. As a result, particularly thin fiber tape pieces can be used. Since the fiber tape pieces and/or the fiber tape matrices soften and/or melt only through contact with and/or by application onto the backing-layer, the process parameters time and temperature can in particular be decoupled so that, once picked up, fiber tape pieces can be further processed in the process despite occurring disturbances and/or pauses. The inventive method is thus particularly suitable for automation.

The fiber tape pieces are preferably provided, in particular in step a), in the solid and/or rigid state, for example at room temperature. Preferably, the fiber tape pieces are free of a binder or a melt adhesive.

According to a further embodiment, the fiber tape pieces are separated and/or cut off from a fiber tape or from at least one fiber tape, in particular before they are provided and/or when they are provided and/or prior to step a) and/or at step a). Preferably, the fiber tape pieces are and/or form pieces of the fiber tape or of the at least one fiber tape. In particular, the fiber tape or the at least one fiber tape comprises a thermoplastic fiber tape matrix with embedded fiber tape fibers. The separation and/or cutting off of the fiber tape pieces from the one or more fiber tapes preferably takes place in the solid and/or rigid state of the or at least one fiber tape, for example at room temperature. In particular, the fiber tape pieces are separated and/or cut off by a cutting device, which preferably provides the fiber tape pieces. The fiber tape or the at least one fiber tape or several fiber tapes are preferably fed to the cutting device.

The fiber tape piece matrices of the fiber tape pieces are preferably made of an identical or the same material. Preferably, the fiber tape piece matrix of each fiber tape piece is and/or forms a piece of the fiber tape matrix of the one or more fiber tapes. In particular, the fiber tape piece matrices of the fiber tape pieces consist of the material of the fiber tape matrix.

The fiber tape piece fibers of the fiber tape pieces are preferably made of identical or the same material. Preferably, the fiber tape piece fibers of each fiber tape piece are and/or form pieces of the fiber tape fibers of the fiber tape or of the at least one fiber tape. In particular, the fiber tape piece fibers of the fiber tape pieces consist of the material of fiber tape fibers.

According to an advantageous embodiment, the fiber tape pieces, in particular in step b), are associated with load paths of the component or of a component to be produced and arranged into the fiber tape pattern according to the load paths. Preferably, in particular in step c), the backing-layer is heated to a temperature which is above the melting temperature of the backing-layer matrix and above the melting temperature of each fiber tape piece matrix. Preferably, in particular in step d), the fiber tape pattern is applied on the backing-layer as a whole. Advantageously, in particular in step d) and/or in step e), the preform which is present in the formable state has a temperature or a mixing temperature that is above the melting temperature of the backing-layer matrix and above the melting temperature of each fiber tape piece matrix. Advantageously, in particular in step e), both the backing-layer and the fiber tape pattern and/or the fiber tape pieces are reshaped.

Preferably, each fiber tape piece is flat or predominantly flat, in particular in step a) and/or in step b) and/or in step d) and/or during the application of the fiber tape pattern on the backing-layer and/or before forming. Advantageously, the fiber tape pattern is flat or predominantly flat, in particular in step b) and/or in step d) and/or during the application of the fiber tape pattern on the backing-layer and/or before forming. Preferably, the backing-layer is flat or predominantly flat, in particular in step c) and/or in step d) and/or during the application of the fiber tape pattern onto the backing-layer and/or before forming. In this way, in particular the formation of the preform can be simplified, since no complicated geometries occur. Preferably, the preform is flat or predominantly flat, in particular in step d) and/or before step e) and/or before forming.

According to an embodiment, the fiber tape pieces of the fiber tape pattern have a different position and/or a different orientation, in particular in step b) and/or in step d) and/or during the application of the fiber tape pattern onto the backing-layer and/or before forming and/or during forming and/or after forming. In this way, the fiber tape pieces can be associated with in particular different load paths of the component to be produced.

According to an embodiment, the fiber tape pieces have different lengths. Thus, in particular different load path lengths of the component to be produced can be taken into account with the fiber tape pieces. Preferably, the fiber tape pieces are provided in different lengths by the cutting device.

Preferably, the backing-layer fibers are and/or comprise continuous fibers and/or the backing-layer fibers are in the form of continuous fibers. In particular, the backing-layer fibers are and/or comprise carbon fibers and/or glass fibers and/or aramid fibers and/or natural fibers. Preferably, the fiber tape piece fibers are and/or comprise continuous fibers and/or pieces of continuous fibers, and/or the fiber tape fibers are in the form of continuous fibers and/or in the form of pieces of continuous fibers. In particular, the fiber tape piece fibers are and/or comprise carbon fibers and/or glass fibers and/or aramid fibers and/or natural fibers. Advantageously, the fiber tape fibers are and/or comprise continuous fibers, and/or the fiber tape fibers are in the form of continuous fibers. In particular, the fiber tape fibers are and/or comprise carbon fibers and/or glass fibers and/or aramid fibers and/or natural fibers.

According to one embodiment, the backing-layer matrix and each fiber tape piece matrix belong of the same group of thermoplastic materials. In particular, the melting temperature of the backing-layer matrix deviates by less than 30 Kelvin from the melting temperature of each fiber tape matrix. Thus, it is in particular easier to cause the heated backing-layer matrix to melt the fiber tape segment matrix.

Preferably, the backing-layer matrix and the fiber tape matrix belong to the same group of thermoplastic materials. In particular, the melting temperature of the backing-layer matrix deviates from the melting temperature of the fiber tape matrix by less than 30 Kelvin.

The backing-layer matrix is preferably composed of polyamide, polypropylene, polyethylene terephthalate, polyether ether ketone, polyphthalamide or thermoplastic polyurethane. In particular, the backing-layer is and/or forms a board and/or a board blank and/or an organic sheet and/or an organic sheet blank. For example, the backing-layer is formed by cutting a board and/or an organic sheet. Preferably, each fiber tape matrix is made of polyamide, polypropylene, polyethylene terephthalate, polyether ether ketone, polyphthalamide or thermoplastic polyurethane. Advantageously, the fiber tape matrix is composed of of polyamide, polypropylene, polyethylene terephthalate, polyether ether ketone, polyphthalamide or thermoplastic polyurethane.

Preferably the backing-layer matrix and the fiber tape segment matrices harden and/or solidify after forming, in particular through cooling. Preferably, the body formed by forming the preform and/or the component formed by forming the preform, hardens and/or solidifies, in particular through cooling. Hardening and/or solidification is associated, for example, with step e) or forms, for example, a step subsequent to step e).

According to a further embodiment, the preform, in particular in step e), is formed by a forming tool. Preferably, the forming tool comprises a cavity. Preferably, the preform, in particular before step e) or at step e), is introduced into the cavity before forming and/or for the purpose of forming. Preferably, the preform is molded into the cavity, in particular by the forming tool. The preform may also be referred to, for example, as an intermediate product. Hardening and/or solidification preferably take place in the forming tool and/or in its cavity.

Due to the softening and/or melting of the fiber tape piece matrices of the fiber tape pieces applied to the backing-layer, the fiber tape pieces preferably form a cohesive connection with the heated backing-layer, whose backing-layer matrix is softened and/or melted. Preferably, the backing-layer and the fiber tape pieces form a cohesive connection with each other, in particular in step d) and/or in step e) and/or during the hardening and/or solidification of the component and/or the formed preform. Preferably, the backing-layer and the fiber tape pieces are materially interconnected in the manufactured component.

Advantageously, a thermoplastic injection-molding compound, preferably for providing at least one supplementary element, is injection-molded on the element that is formed by forming the preform in the cavity of the forming tool and/or on the component that is formed by forming the preform in the cavity of the forming tool and/or in a separate cavity. Thus, in particular at least one additional element or the at least one additional supplementary can be provided on the body and/or on the component. The injection molding compound is e.g. free of reinforcing fibers. Preferably, however, the injection molding compound includes and/or contains reinforcing fibers. If the molding is performed in the cavity of the forming tool, the step of hardening and/or solidification preferably also includes the hardening and/or solidification of the injection molding compound.

According to a further embodiment, the fiber tape pieces, in particular in step a), are provided at one or at least one predefined position and/or at predefined positions. Advantageously, the fiber tape pieces, in particular in step b), are picked up in succession or simultaneously. Preferably, the fiber tape pieces, in particular in step b), are arranged into the fiber tape pattern successively or simultaneously. Preferably, the fiber tape pattern, in particular in step d), is applied to the heated backing-layer at a different position.

According to one embodiment, the provided fiber tape pieces are picked up, in particular in step b) and/or preferably at the predefined position or at the at least one predefined position, by a handling device and placed in relation to the fiber tape patterns. The fiber tape pieces are thus preferably provided, in particular in step a), to the handling device or to a handling device. Advantageously, the fiber tape pieces picked up by the handling device are heated. For this purpose, the handling device has in particular a heater. Preferably, the fiber tape pieces picked up by the handling device are heated to a temperature which is below the melting temperature of each fiber tape piece matrix and/or below the melting temperature of the fiber tape matrix. Preferably, the fiber tape pattern, in particular in step d) and/or preferably at the other position, applied on the backing-layer by the handling device or by another handling device.

The method according to the invention is preferably carried out by a manufacturing plant. The manufacturing plant includes in particular the handling device and/or the cutting device and/or the forming tool.

In particular, a component of high geometric complexity can be produced with the method according to the invention. Preferably, two thermo-plastically pre-consolidated fiber materials (backing-layer, fiber tape pieces) are pre-fabricated into an intermediate product (preform) and thereafter formed.

In particular, the invention makes it possible to increase the material anisotropy by using load-oriented fiber sections (fiber tape pieces).

The aforementioned conflict between economy and mechanical properties of the continuous material can be resolved, for example, in that the board blank (backing-layer) is no longer designed commensurate with the peak stress, but in accordance with an underlying stress level, wherein the peak stress can in particular be accommodated or absorbed by additionally and locally applied fiber material (fiber tape pieces).

Advantageously, a plurality of fiber tape pieces are picked up and/or arranged, preferably simultaneously or successively, in particular at ambient temperature, in the handling device to form the fiber tape pattern or a fiber tape pattern. In particular, the handling device is capable of successively picking up several fiber tape pieces or at least two fiber tape pieces and arranging and/or placing them in the fiber tape pattern. For this purpose, flat continuous fiber tapes are preferably fed to the manufacturing plant, which can be provided by the cutting device in different lengths depending on the required load. In particular, the handling device picks up the fiber tape pieces for the fiber tape pattern or for a fiber tape pattern in succession and deposits the entire fiber tape pattern at one time.

Preferably, the backing-layer, in particular in step c), is heated to such a temperature that the resulting temperature or mixture temperature remains above the melting temperature of the matrix of fiber tape pieces and backing-layer when placing the fiber tape pattern on the backing-layer, preferably until forming. This ensures, in particular, that the resulting intermediate product, i.e. the preform, can be formed. The preform is preferably formed promptly after the fiber tape pattern has been applied on the heated backing-layer, so that the preform remains deformable until forming and in particular does not cool down to a temperature at which the matrices or at least one of the matrices harden.

Binder or binder materials in the context of processing of thermoplastic continuous fiber tapes are generally understood as meaning additional low-melting thermoplastic layers that have an adhesive effect due to the influence of temperature. By choosing the temperature or mixture temperature of the fiber tape pattern and backing-layer to be above the melting temperature of the matrix of both starting materials, in particular the use of binder materials for fixing the fiber tape pieces on the backing-layer can be dispensed with.

Local temperature and stress peaks, which are frozen in the component as production parameters, occur with conventional processing of fiber tapes when using local melting and pressing down with a roller. These can increase the warpage of the components manufactured therefrom. Therefore, it is common practice to reduce the processing stress of such fabricated composite structures by repeated and homogeneous heating under forced compaction. According to one embodiment of the invention, this additional method step is bypassed in that all initial products intended to be formed experience at a common time across the entire surface a temperature above the melting point of each matrix before forming. The surface pressure conventionally applied by the pressure roller is preferably applied by the forming tool over the entire surface when the mold cavity is closed during forming.

The method step b) is preferably carried out after the method step a). The method step d) is preferably carried out after the method step b). Furthermore, the method step d) is preferably carried out after the method step c). In this case, the method step c) can be carried out, for example, before, during or after the method step a) and/or before, during or after the method step b). The method step e) is preferably carried out after the method step d).

In the successive production of several components in accordance with the method of the invention, the material flow can preferably be increased and/or the cycle time can be particularly reduced by performing the three steps indicated below in parallel:
- forming of the preform and subsequent solidification by cooling of the thermoplastic matrix, in particular for a preceding component of the components,
- tempering the backing-layer, in particular for a component of the components following the preceding component,
- separating the fiber tape into fiber tape pieces, receiving the fiber tape pieces and laying the fiber tape pieces into the fiber tape pattern, in particular for the subsequent component or for a component following the subsequent component.

The invention further relates to a component made of fiber composite material produced by the method according to the invention.

BRIEF DESCRIPTION OF THE DRAWINGS

The invention will now be described with reference to a preferred embodiment with reference to the drawing. The drawing shows in.

DETAILED DESCRIPTION OF THE INVENTION

Figure 1:
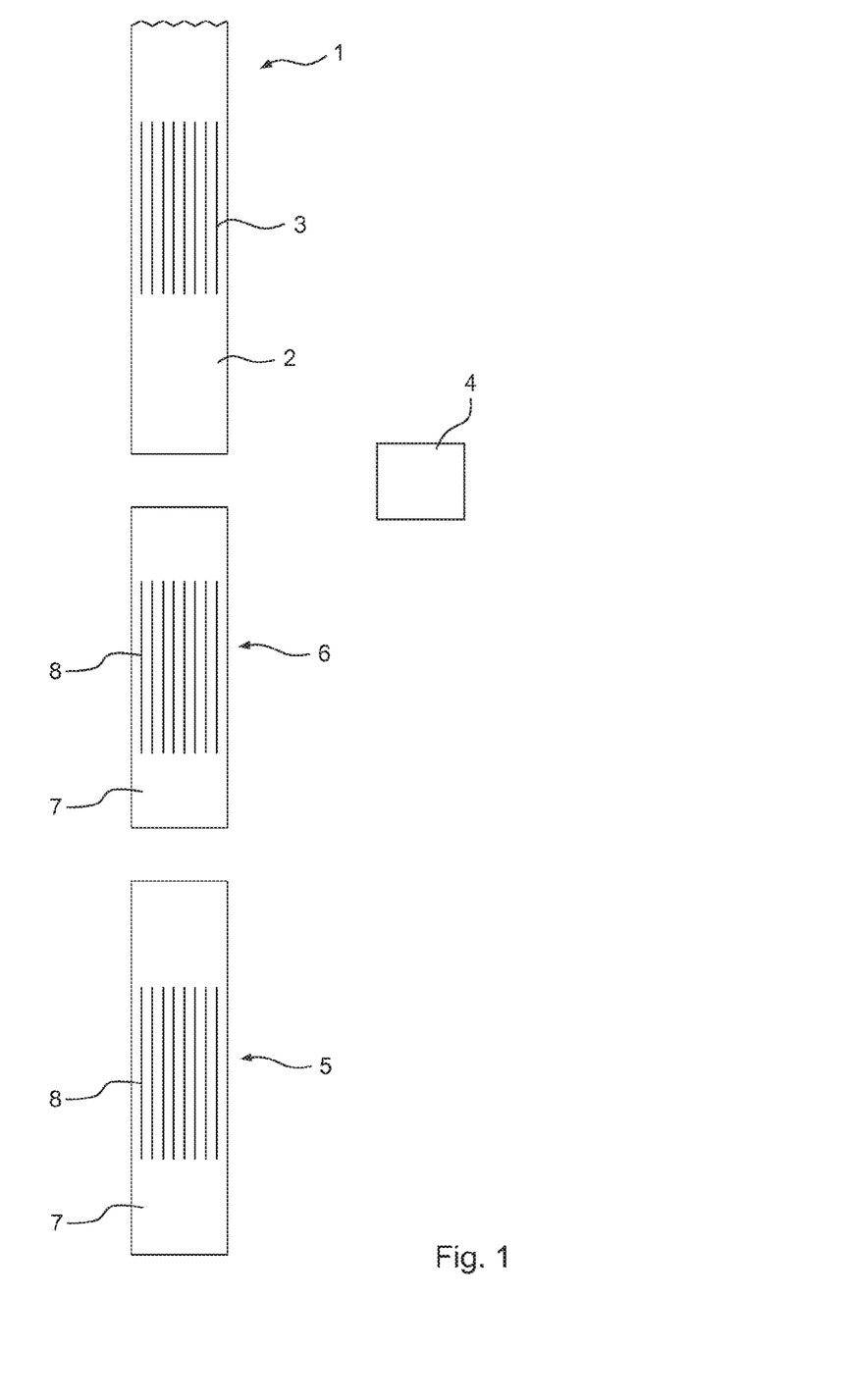
FIG. 1 a plan view of a fiber tape and several fiber tape pieces separated from the fiber tape,
FIG. 2 a plan view of the fiber tape pieces,
FIG. 3 a plan view of a fiber tape pattern formed from the fiber tape pieces,
FIG. 4 a plan view of a backing-layer,
FIG. 5 a plan view of a preform formed from the backing-layer and the fiber tape pattern,
FIG. 6 a schematic sectional view of a forming tool for forming the preform, and
FIG. 7 a side view of a component formed by forming the preform.
Figure 2:
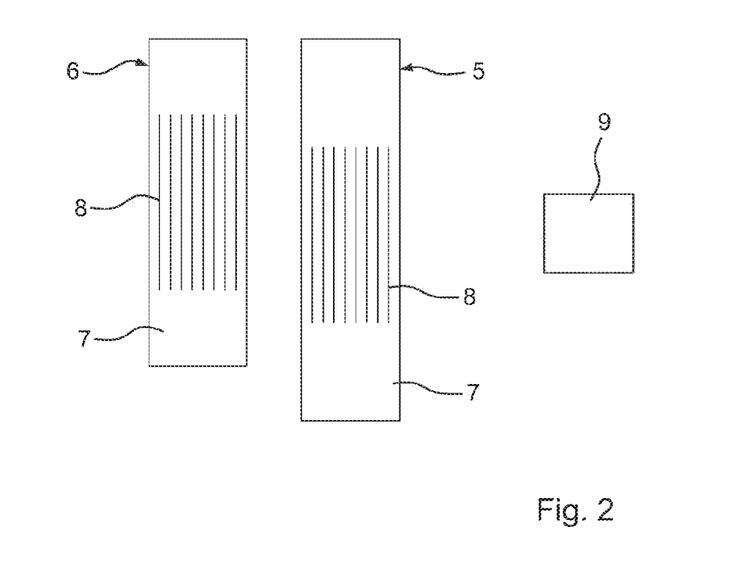
Figure 3:
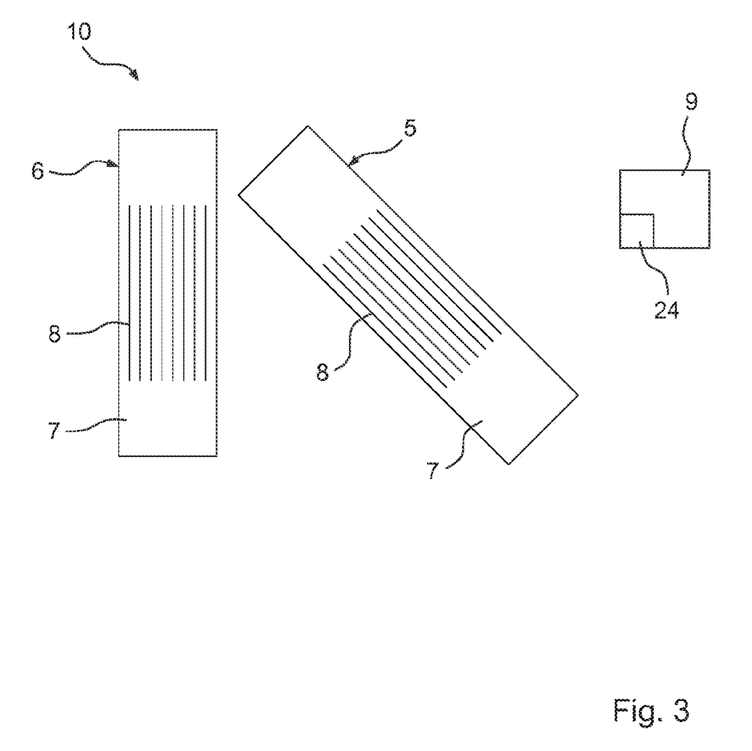

FIG. 1 shows a plan view of a fiber tape 1, shown only partially, which includes a thermoplastic fiber tape matrix 2 and fiber tape fibers 3 in the form of continuous fibers embedded therein, which are indicated only schematically. Several flat or planar fiber tape pieces 5 and 6 are separated from the fiber tape 1 by a schematically depicted cutting device 4 and provided at a predefined position, as is apparent from FIG. 2, which shows the provided fiber tape pieces 5 and 6 in a plan view. The fiber tape pieces 5 and 6 have different lengths and are present in the solid state and have each a fiber tape piece matrix 7 separated from the fiber tape matrix 2 with embedded fiber tape piece fibers 8, which are separated from the fiber tape fibers 3 and are indicated only schematically. The provided fiber tape pieces 5 and 6 are picked up in the solid state by a schematically depicted handling device 9 and arranged into a flat or planar fiber tape pattern 10, as can be seen in the plan view of FIG. 3. In the fiber tape pattern 10, the fiber tape pieces 5 and 6 have a different position and a different orientation. Alternatively, however, the fiber tape pieces 5 and 6 may for example be oriented identically in the fiber tape pattern 10 and/or the fiber tape pieces may overlap regionally or at least in certain regions. Preferably, the fiber tape pieces 5 and 6 are heated by the handling device 9 to a temperature below the melting temperature of each fiber tape piece matrix 7. For this purpose, the handling device 9 has in particular a schematically indicated heater 24.

Figure 4:
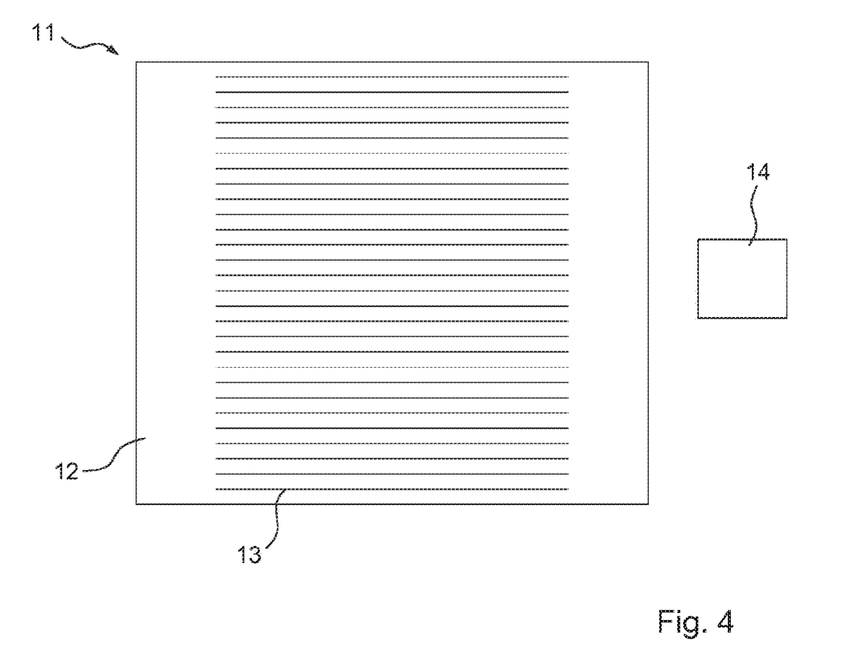
Figure 5:
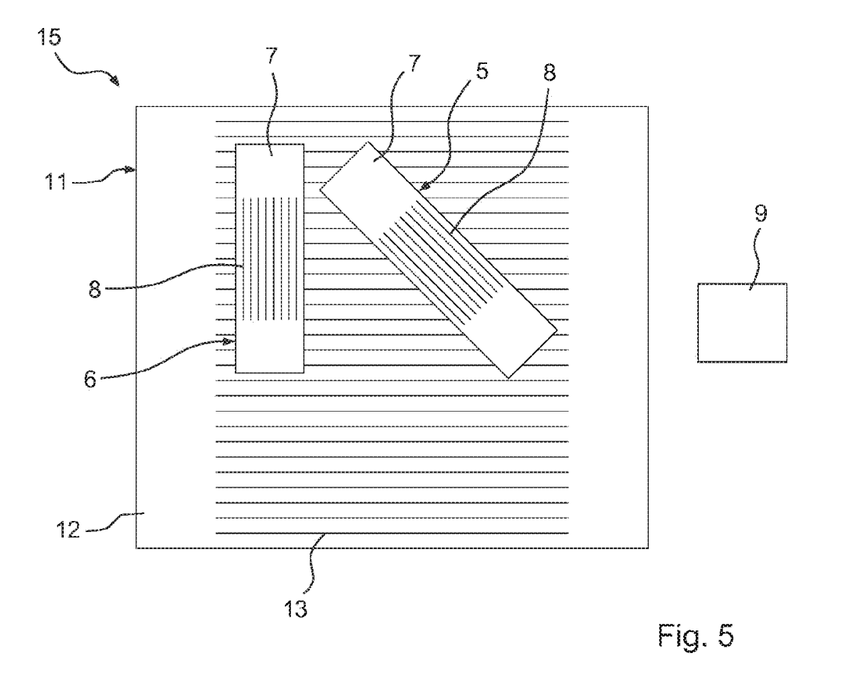

Furthermore, a planar or flat backing layer 11 is provided which is depicted in FIG. 4 and which includes a thermoplastic backing-layer matrix 12 with backing-layer fibers 13 in the form of continuous fibers embedded therein, which are indicated only schematically. The backing layer 11 is in particular an organic sheet or organic sheet blank. The backing layer 11 is heated by a schematically indicated heater 14, so that its temperature is above the melting temperature of the fiber tape segment matrix 7 and above the melting temperature of the backing-layer matrix 12, so that the backing-layer matrix 12 melts. Subsequently, the fiber tape pattern 10 which is present in the solid state is applied in its entirety by the handling device 9 on the heated backing layer 11, as shown in FIG. 5. Since the fiber tape pattern 10 and/or the fiber tape pieces 5 and 6 of the fiber tape pattern 10 are in direct contact with the heated backing layer 11, the fiber tape piece matrices 7 are melted by the heated backing layer 11. The backing layer 11 with the applied fiber tape pattern 10 forms a preform 15, which is in a deformable state, since both the backing-layer matrix 12 and the fiber tape piece matrices 7 are melted.

As long as the preform 15 is in the deformable state, it is supplied by the handling device 9 or by another handling device to a forming tool 17, which has an upper tool 18 and a lower tool 19, in which a cavity 16 is provided. In particular, the preform 15 is introduced into the cavity 16 of the forming tool 17, as shown in a schematic sectional view of FIG. 6. Here, the preform 15 to be introduced into the cavity 16 is shown schematically. The upper tool 18 has a projection 20 which can dip into the cavity 16. The tools 18 and 19 will then be moved together so that the projection 20 is immersed in the cavity 16 and the preform 15 arranged between the tools 18 and 19, in particular in the cavity 16, is formed under pressure into a component 21.

Figure 6:
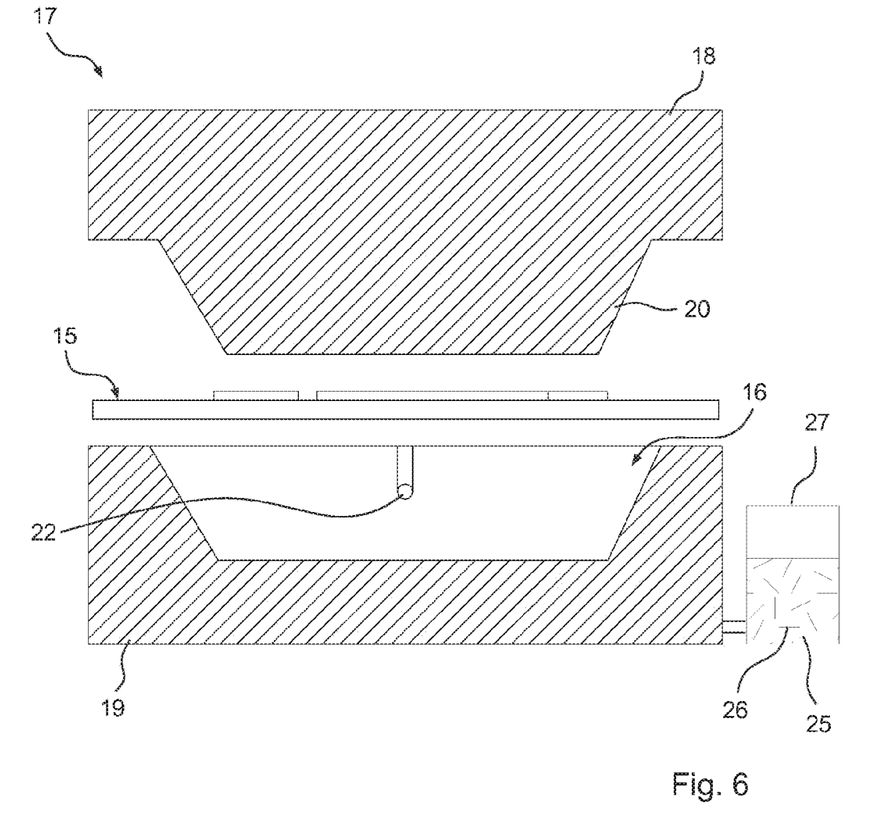

In addition, additional elements can be molded on the component 21 in the cavity 16 by injecting a thermoplastic injection molding compound 25 into the cavity 16. For this purpose, at least one schematically indicated and externally accessible passage 22 to the cavity 16 is provided in the forming tool 17, through which the injection molding material 25 is introduced into the cavity 16. The injection molding material 25 is mixed with reinforcing fibers 26 and accommodated in a container 27 connected with the forming tool 17.

Figure 7:
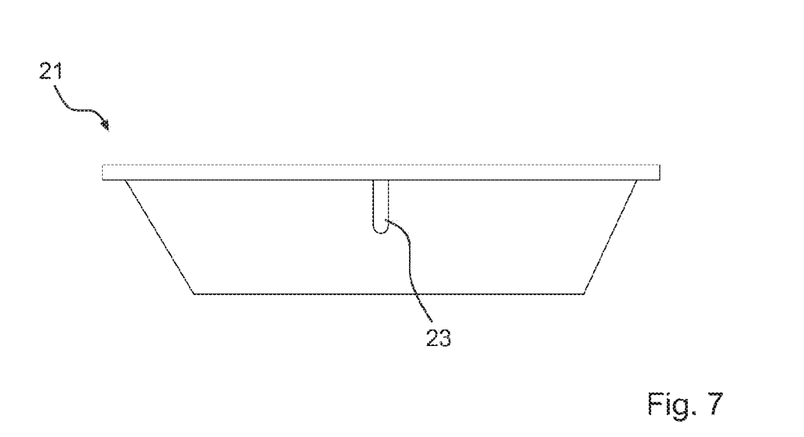

Subsequently, the component 21 cools down and solidifies. The solid component 21 is removed from the forming tool 17, as shown in the detailed view of FIG. 7. Furthermore, an element 23 formed on the component 21 by injecting the injection molding material 25 is also indicated.

LIST OF REFERENCE NUMBERS 1 fiber tape
2 fiber tape matrix
3 fiber tape fibers
4 cutting device
5 fiber tape piece
6 fiber tape piece
7 fiber tape piece matrix
8 fiber tape piece fibers
9 handling device
10 fiber tape pattern
11 backing layer
12 backing-layer matrix
13 backing-layer fibers
14 heating device
15 preform
16 cavity of the forming tool
17 forming tool
18 upper tool of the forming tool
19 lower tool of the forming tool
20 projection of the upper tool
21 component
22 passage
23 additional element on the component
24 heater of the handling device
25 injection molding material
26 reinforcing fibers in the injection molding material
27 container for the injection molding compound

The invention claimed is:

1. A method for producing a component from a fiber composite material, comprising the following steps:
   a) providing a plurality of fiber tape pieces (5, 6), each comprising a thermoplastic fiber tape piece matrix (7) with fiber tape piece fibers (8) embedded therein,
   b) picking up and arranging the fiber tape pieces (5, 6) in a solid state to form a fiber tape pattern (10),
   c) providing and heating a backing layer (11) comprising a thermoplastic backing-layer matrix (12) with backing-layer fibers (13) embedded therein, such that the backing-layer matrix (12) softens or melts,
   d) forming a preform (15) from the backing layer (11) and the fiber tape pattern (10) by applying the fiber tape pattern (10) in the solid state onto the heated backing layer (11), and then heating the applied fiber tape pattern with the heated backing layer (11) so that the fiber tape piece matrices (7) soften or melt, thus forming the preform (15) into a deformable state in which both the backing-layer matrix (12) and fiber tape piece matrices (7) are softened or melted, and
   e) deforming the preform (15) that is present in the deformable state.

2. The method according to claim 1, wherein the backing layer (11) is flat or predominantly flat before forming.

3. The method according to claim 1, wherein the fiber tape pattern (10) is flat or predominantly flat before forming.

4. The method according to claim 1, wherein the fiber tape pieces (5, 6) of the fiber tape pattern (10) have a different position and/or a different orientation.

5. The method according to claim 1, wherein the fiber tape pieces (5, 6) have different lengths.

6. The method according to claim 1, wherein the backing-layer fibers (13) and/or the fiber tape piece fibers (8) comprise continuous fibers.

7. The method according to claim 1, wherein the backing-layer fibers (13) and/or the fiber tape piece fibers (8) arc or comprise carbon fibers and/or glass fibers and/or aramid fibers and/or natural fibers.

8. The method according to claim 1, wherein the fiber tape pieces (5, 6) are separated from at least one fiber tape (1) before or at the time they are provided, wherein the fiber tape (1) comprises a thermoplastic fiber tape matrix (2) embedded therein with fiber tape fibers (3) in the form of continuous fibers.

9. The method according to claim 1, wherein the backing-layer matrix (12) and each fiber tape piece matrix (7) belong to the same group of thermoplastic materials and/or the melting temperature of the backing-layer matrix (12) differs from the melting temperature of each fiber tape piece matrix (7) by less than 30 Kelvin.

10. The method according to claim 1, wherein the backing-layer matrix (12) and/or each fiber tape piece matrix (7) comprises polyamide, polypropylene, polyethylene terephthalate, polyether ether ketone, polyphthalamide or thermoplastic polyurethane.

11. The method according to claim 1, wherein the deformation of the preform (15) takes place within a cavity (16) in a forming tool (17).

12. The method according to claim 11, further comprising molding a thermoplastic injection molding compound (25) on the deformed preform (15) in the cavity (16) of the forming tool (17) or in a separate cavity.

13. The method according to claim 1, wherein the provided fiber tape pieces (5, 6) are picked up and arranged into the fiber tape pattern (10) by a handling device (9).

14. The method according to claim 13, further comprising heating the fiber tape pieces (5, 6) picked up by the handling device (9) to a temperature which is below the melting temperature of each fiber tape piece matrix (7).

* * * * *

UNITED STATES PATENT AND TRADEMARK OFFICE
CERTIFICATE OF CORRECTION

PATENT NO. : 10,730,248 B2
APPLICATION NO. : 16/097055
DATED : August 4, 2020
INVENTOR(S) : Haeffelin et al.

Page 1 of 1

It is certified that error appears in the above-identified patent and that said Letters Patent is hereby corrected as shown below:

In the Claims

Claim 7, Column 10, Line 31, delete "arc or".

Signed and Sealed this
Twenty-second Day of September, 2020

Andrei Iancu
*Director of the United States Patent and Trademark Office*